United States Patent

Lee

(10) Patent No.: US 11,065,947 B2
(45) Date of Patent: Jul. 20, 2021

(54) APPARATUS AND METHOD FOR TRACKING LOCATION OF SUNROOF BLIND

(71) Applicants: HYUNDAI MOTOR COMPANY, Seoul (KR); KIA MOTORS CORPORATION, Seoul (KR)

(72) Inventor: Cheol-Ho Lee, Bucheon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 204 days.

(21) Appl. No.: 16/205,560

(22) Filed: Nov. 30, 2018

(65) Prior Publication Data

US 2020/0062090 A1 Feb. 27, 2020

(30) Foreign Application Priority Data

Aug. 23, 2018 (KR) .................. 10-2018-0098567

(51) Int. Cl.
*B60J 7/00* (2006.01)
*B60J 7/043* (2006.01)

(52) U.S. Cl.
CPC .............. *B60J 7/0007* (2013.01); *B60J 7/043* (2013.01)

(58) Field of Classification Search
None
See application file for complete search history.

(56) References Cited

U.S. PATENT DOCUMENTS

| | | | | |
|---|---|---|---|---|
| 5,193,029 A | * | 3/1993 | Schofield | B60Q 1/14 250/200 |
| 5,778,517 A | * | 7/1998 | Amesbichler | B62D 65/06 29/281.4 |
| 6,536,829 B2 | * | 3/2003 | Schlecht | B60J 1/2027 160/370.21 |
| 6,695,381 B2 | * | 2/2004 | Schlecht | B60J 1/2019 160/370.22 |
| 6,899,380 B2 | * | 5/2005 | Kralik | B60J 7/0015 160/273.1 |
| 2002/0195843 A1 | * | 12/2002 | Glasl | B60J 7/0015 296/214 |
| 2006/0066141 A1 | * | 3/2006 | Fuchs | B60J 7/0573 296/223 |
| 2006/0082192 A1 | * | 4/2006 | Dubay | B60J 1/2011 296/214 |

(Continued)

FOREIGN PATENT DOCUMENTS

| | | | | |
|---|---|---|---|---|
| JP | 2013155500 | * | 8/2013 | ............... B60J 5/06 |
| KR | 20130105055 A | | 9/2013 | |

(Continued)

OTHER PUBLICATIONS

English Translation of KR 101799205 (Year: 2019).*
Translation of description of Araki JP2013155500 (Year: 2012).*

*Primary Examiner* — Nicholas K Wiltey
(74) *Attorney, Agent, or Firm* — Morgan, Lewis & Bockius LLP

(57) ABSTRACT

An apparatus for tracking the location of a sunroof blind includes: a motor connected to the sunroof blind by a cable; and a controller for determining whether or not a wake-up is performed according to an electromotive force of the motor, and for correcting location information of the sunroof blind according to a determination result.

15 Claims, 5 Drawing Sheets

(56) References Cited

U.S. PATENT DOCUMENTS

| | | | |
|---|---|---|---|
| 2011/0203749 A1* | 8/2011 | Klotz | B60J 1/2055 |
| | | | 160/311 |
| 2014/0084639 A1* | 3/2014 | Lee | B60J 1/2019 |
| | | | 296/219 |
| 2015/0153936 A1* | 6/2015 | Lim | G06F 3/04883 |
| | | | 715/716 |
| 2016/0344386 A1* | 11/2016 | Buttolo | H03K 17/955 |
| 2018/0141563 A1* | 5/2018 | Becker | G06K 9/00791 |
| 2018/0265043 A1* | 9/2018 | Salter | B60H 1/00785 |
| 2019/0017311 A1* | 1/2019 | McGettrick | E05F 15/603 |

FOREIGN PATENT DOCUMENTS

| | | | |
|---|---|---|---|
| KR | 20140013531 A | | 2/2014 |
| KR | 101799205 B1 | * | 11/2017 |
| KR | 101855859 B1 | | 5/2018 |

* cited by examiner

APPARATUS AND METHOD FOR TRACKING LOCATION OF SUNROOF BLIND

CROSS-REFERENCE TO RELATED APPLICATION

This application claims priority to Korean Patent Application No. 10-2018-0098567 filed on Aug. 23, 2018 in the Korean Patent Office, which is incorporated herein by reference in its entirety.

TECHNICAL FIELD

The present disclosure relates to a technique for controlling a sunroof blind, and more particularly, to an apparatus and a method for tracking the location of a sunroof blind, which automatically tracks the location of the sunroof blind and executes correction according to the tracking.

BACKGROUND

Generally, a sunroof is located on the ceiling of a vehicle. Such a sunroof includes a pop-up system that opens upwards, a folding system that is folded, an opening/closing system of a top mount that opens by pushing backwards like a drawer, a panoramic system that covers the entire ceiling of the vehicle with tempered glass, etc. for each opening/closing system.

In addition, there is a dual panoramic sunroof, when a vehicle door is severely closed in a non-operation condition, the sunroof cover can be distorted. That is, when the vehicle door is suddenly closed, the pressure in the vehicle increases, and accordingly, an external force is applied to the sunroof. This delivers the external force to a cable and a motor for the sunroof, consecutively, which causes the motor to be pushed. Finally, the location of the sunroof may be interrupted.

That is, the location is not completely interrupted by a single external force, but the interrupted location is slowly increased by several tens to several hundreds of accumulations. Since the changed location is increased, the blind cannot be fully opened, and the abnormal interlocking operation with the glass occurs.

Accordingly, there is a problem in that the blind and the motor must not be moved by an external force, such that a clamp, etc. has to be applied to the motor to prevent their movement, thus increasing the cost.

The contents described in Description of Related Art are to help the understanding of the background of the present disclosure, and can include what is not previously known to those skilled in the art to which the present disclosure pertains.

SUMMARY OF THE DISCLOSURE

The present disclosure is intended to solve the problem, and an object of the present disclosure is to provide an apparatus and a method for tracking the location of a sunroof blind, which can automatically track the location of a sunroof blind.

In addition, another object of the present disclosure is to provide an apparatus and a method for tracking the location of a sunroof blind, which can execute correction according to the automatic tracking.

In order to achieve the objects, the present disclosure provides an apparatus for tracking the location of a sunroof blind, which can automatically track the location of a sunroof blind.

The apparatus for tracking the location of the sunroof blind includes: a motor connected to the sunroof blind by a cable; and a controller for determining whether or not a wake-up is performed according to an electromotive force of the motor, and for correcting location information of the sunroof blind according to a determination result.

The whether or not the wake-up is performed is executed in a non-operation state.

The controller forcibly performs a close when a corrected location value generated by the correction is greater than a reference value.

The reference value is a value indicating that the sunroof blind is in an incomplete closed.

The controller operates the motor according to an operation command when the whether or not the wake-up is performed is executed by the operation command according to the user's input.

The correction is performed by adding a setting value to a current stored location value that is previously stored.

The location information is generated through a sensor for sensing the amount of rotation according to rotation of the motor.

The apparatus for tracking the location of the sunroof blind further includes a display device for outputting the location information thereon.

The output is at least one of graphics, characters, and voices.

The controller forcibly performs a close when the number of times that the corrected location value is smaller than a reference value is greater than a value of a reference number of times.

Another embodiment of the present disclosure provides a method for tracking the location of a sunroof blind including: determining, by a controller, whether or not a wake-up is performed according to an electromotive force of a motor that is connected to the sunroof blind by a cable; and correcting, by the controller, location information of the sunroof blind according to a determination result.

The method for tracking the location of the sunroof blind further includes outputting the location information to a display device.

According to the present disclosure, it is possible to automatically track and correct the location of the sunroof blind, thus improving the incomplete closed, the incomplete opened, the failure of the interlocking operation, etc. that occur in the field.

In addition, as another effect of the present disclosure, it is possible to remove the stopper applied to the opening direction.

In addition, as still another effect of the present disclosure, it is possible to apply the system load in the reduced state, thus further improving performance thereof.

DESCRIPTION OF SPECIFIC EMBODIMENTS

Figure 1:
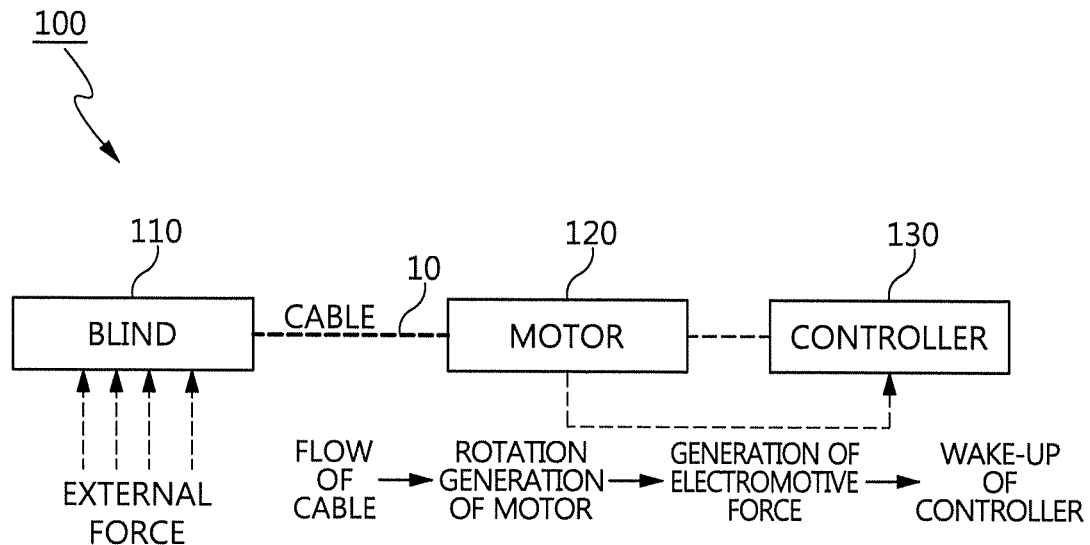
FIG. 1 is a block diagram of a configuration of an apparatus for tracking the location of a sunroof blind in accordance with an embodiment of the present disclosure.

Various modifications and various embodiments can be made in the present disclosure, so that specific embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like elements in describing each drawing. The terms "first," "second," and the like can be used to illustrate various components, but the components should not be limited by the terms. The terms are used only to differentiate one component from another component.

For example, a first component can be referred to as a second component, and similarly, the second component can be also referred to as the first component without departing from the scope of the present disclosure. The terms "and/or" includes a plurality of related listed items or any of a plurality of related listed items.

Unless otherwise defined, all terms including technical and scientific terms used herein have the same meaning as commonly understood by one of ordinary skill in the art to which the present disclosure belongs.

It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, an apparatus and a method for tracking a sunroof blind in accordance with an embodiment of the present disclosure will be described in detail with reference to the accompanying drawings.

FIG. 1 is a block diagram of a configuration of an apparatus for tracking the location of a sunroof blind in accordance with an embodiment of the present disclosure. Referring to FIG. 1, the apparatus 100 can be configured to include a sunroof blind 110, a motor 120 that is connected to the sunroof blind 110 by a cable 10, a controller 130 for controlling the motor 120, etc.

The sunroof blind 110 uses the panoramic system, but is not limited thereto. The sunroof blind 110 is connected to the motor 120 by the cable 10. Accordingly, the sunroof blind 110 performs a linear motion along a rail (not illustrated) according to the forward rotation of the motor 120 or the reverse rotation thereof. The sunroof blind 110 becomes a "closed" or "opened" state according to the linear motion.

The motor 120 can use a Direct Current (DC) motor, a Brushless Direct Current (BLDC) motor, etc. The motor 120 is driven by receiving power from a battery (not illustrated) configured in the vehicle.

The battery can be a lead storage battery, a secondary battery, etc. In the secondary battery, a battery cell (not illustrated) is configured in series and/or in parallel, and the battery cell can be a high voltage battery cell for an electric vehicle such as a nickel metal battery cell, a lithium ion battery cell, a lithium polymer battery cell, and a solid state battery cell. Generally, the high voltage battery is a battery used as a power source for moving the electric vehicle and refers to a high voltage of 100V or more. However, it is not limited thereto, and a low voltage battery is also possible.

The controller 130 determines whether or not the wake-up is performed according to an electromotive force, and corrects the location information of the sunroof blind 110 according to the determination result. In addition, the controller 130 controls the movement length of the sunroof blind 110 through the forward rotation or reverse rotation operation of the motor 120.

Figure 2:
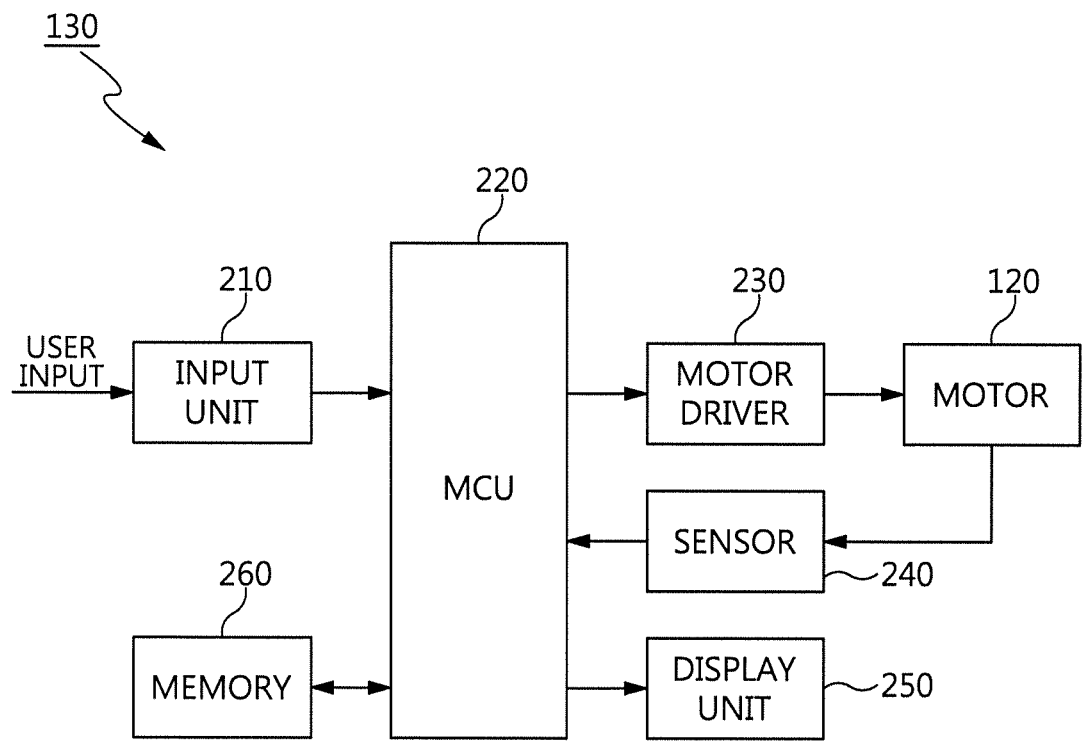
FIG. 2 is a block diagram illustrating a detailed configuration of a controller illustrated in FIG. 1.

FIG. 2 is a block diagram illustrating a detailed configuration of the controller 130 illustrated in FIG. 1. Referring to FIG. 2, it can be configured to include a Microprocessor unit (MCU) 220 for receiving an operation command (i.e., an operation signal) from an input device 210 for receiving the operation command of the user or an electromotive force signal by the electromotive force of the motor 120 to determine whether or not the wake-up is performed, a memory 260 for storing a program, data, location information, etc. for controlling the motor 120, etc.

The input device 210 can be a microphone, a touch panel, an operation button, etc.

A motor driver 230 drives the motor 120 according to the control of the MCU 220. When the electromotive force is generated from the motor 120, it is generated as a signal and transmitted to the controller 130. For this purpose, the motor driver 230 can be configured to include an inverter, a converter, an Integrated Circuit (IC) circuit, etc.

A sensor 240 senses the amount of rotation of a rotor (not illustrated) configured in the motor 120 to transmit it to the controller 130. The movement distance of the sunroof blind 110 is calculated according to the amount of rotation thereof. For this purpose, a look-up table in which the movement distance value according to the amount of rotation is matched can be configured in the memory 260. The sensor 240 can be a Hall sensor, a resolver, an encoder, etc. The sensor 240 can be configured in the motor 120 together.

The memory 260 can be a memory provided in the MCU 220, and can be a separate memory. Accordingly, it can be configured by a combination of a non-volatile memory such as a Solid State Disk (SSD), a hard disk drive, a flash memory, an Electrically Erasable Programmable Read-Only Memory (EEPROM), a Static RAM (SRAM), a Ferroelectric RAM (FRAM), a Phase-change RAM (PRAM), and a Magnetic RAM (MRAM) and/or a volatile memory such as a Dynamic Random Access Memory (DRAM), a Synchronous Dynamic Random Access Memory (SDRAM), and a Double Date Rate-SDRAM (DDR-SDRAM).

A display device 250 outputs location information of the sunroof blind 110, operation information of the sunroof blind, driving information, etc. Accordingly, the display device 250 outputs such information, etc. by a combination of graphics, characters, voices, etc. For this purpose, the display device 250 can be configured to include a speaker and a display. The display can be a Liquid Crystal Display (LCD), a Light Emitting Diode (LED) display, an Organic Light Emitting Diode (OLED) display, a touch screen, a flexible display, a Head Up Display (HUD), etc.

Figure 3:
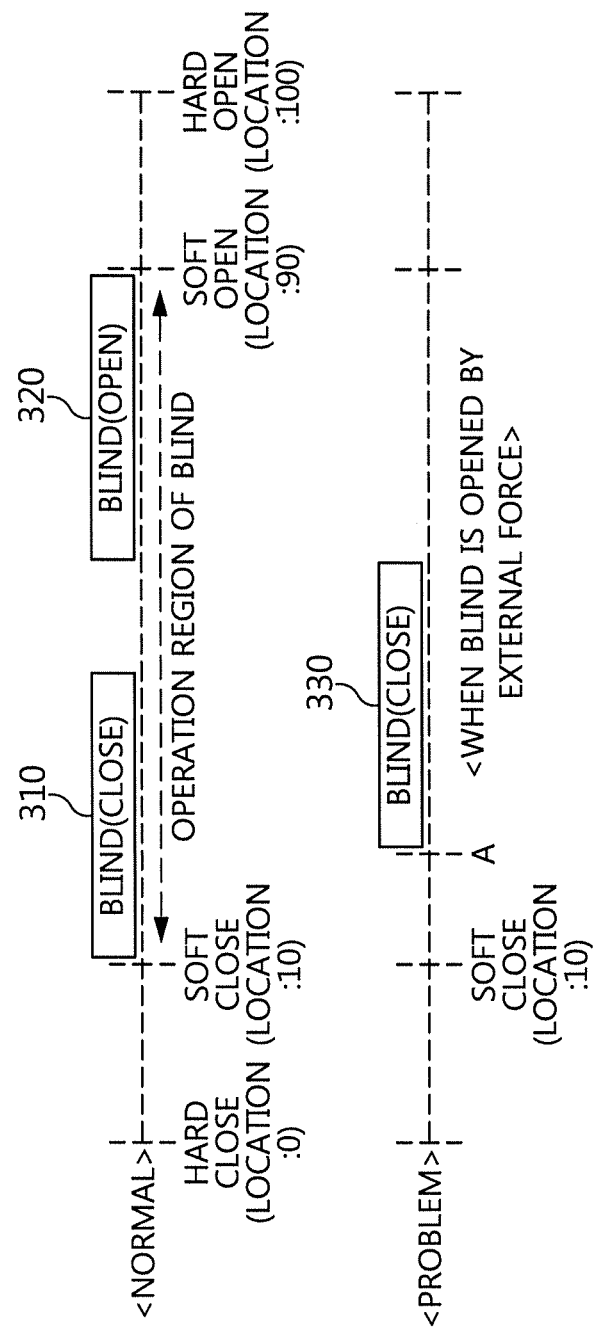
FIG. 3 is a conceptual diagram generally illustrating a difference between the actual location of a blind and the recognized location of the controller.

FIG. 3 is a conceptual diagram generally illustrating a difference between the actual location of the sunroof blind 110 and the recognized location of the controller. Referring to FIG. 3, the section of the graph can be configured as a hard close state that the sunroof blind 110 is fully closed (location: 0), a soft close state that is loosely closed (location: 10), a soft open state that is loosely opened (location: 90), and a hard open state that is fully opened (location: 100).

Generally, the operation region of the sunroof blind 110 becomes between the soft close state (location: 10) and the soft open state (location: 90). Accordingly, in a "normal," the sunroof blind 110 is in a close state 310 or in an open state 320.

In contrast, in a "problem," the sunroof blind 110 is moved by a reference value A from the soft close (location: 10) by an external force 330. That is, it is opened by the reference value A from the soft close (location: 10).

In this time, the controller 130 knows that the current location of the sunroof blind 110 is in the soft close (location: 10). However, the actual physical current location of the sunroof blind 110 becomes the reference value A. That is, the recognized location of the controller 130 and the actual physical location of the sunroof blind 110 are different. Accordingly, this causes the malfunction thereof. Particularly, the controller 130 confuses the starting point of opening the sunroof blind 110 as the reference value A. In this case, the operation region of the blind is deviated therefrom.

Figure 4:
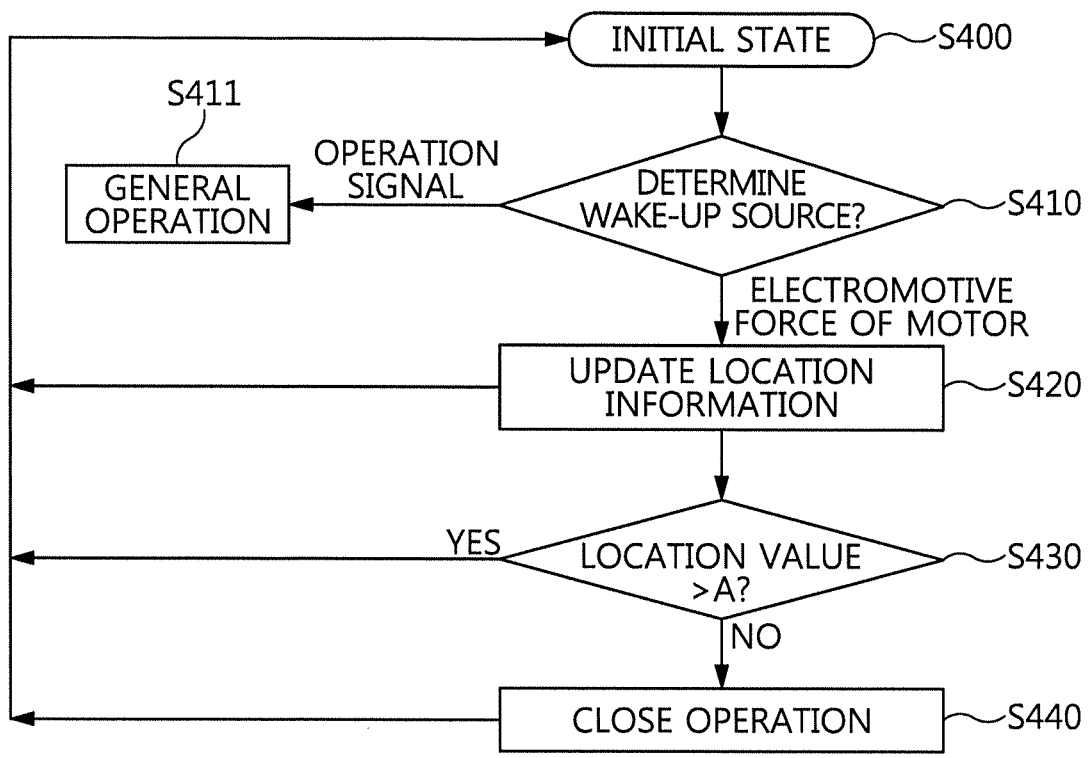
FIG. 4 is a flowchart illustrating a procedure of tracking and correcting the location of the sunroof blind in accordance with an embodiment of the present disclosure.

FIG. 4 is a flowchart illustrating a procedure of tracking and correcting the location of the sunroof blind in accordance with an embodiment of the present disclosure. Referring to FIG. 4, the controller (130 in FIG. 1) maintains an initial state until a wake-up is performed S400. That is, it means that the sunroof blind (110 in FIG. 1) is in a non-operation state (a sleep).

In the initial state, the controller 130 determines a wake-up source S410. As the determination result, in the S410, when the wake-up source is the operation command according to the user's input, the general operation according to the operation command (the operation signal) is executed S411. That is, the user directly controls the location of the sunroof blind 110 directly through the input device 210.

In contrast, in the S410, when the wake-up source is an electromotive force of the motor (120 in FIG. 1) generated by the external force, the stored current location information is updated to generate the corrected location value S420. That is, a specific value (e.g., +1) is added to the location value of the location information stored in the memory (260 in FIG. 2) to execute correction.

Then, the controller 130 determines whether or not the corrected location value is greater than the predetermined reference value A that can be regarded as an incomplete close in the non-operation state S430.

As the determination result, in the S430, when the corrected location value is smaller than the reference value A, the S400 to S430 are performed again.

In contrast, as the determination result, in the S430, when the corrected location value is greater than the reference value A, the controller 130 forcibly performs a close S440. Then, the S400 to S440 are performed again.

In another embodiment of the present disclosure, even if the corrected location value is smaller than the reference value A in the non-operation state, the close is forcibly performed even when the state occurs repeatedly. That is, when the number of times that the corrected location value is smaller than the reference value A is greater than a value of a predetermined reference number of times, the close is forcibly performed in order to automatically correct the location because it can be regarded as an incomplete open from the outside.

Figure 5:
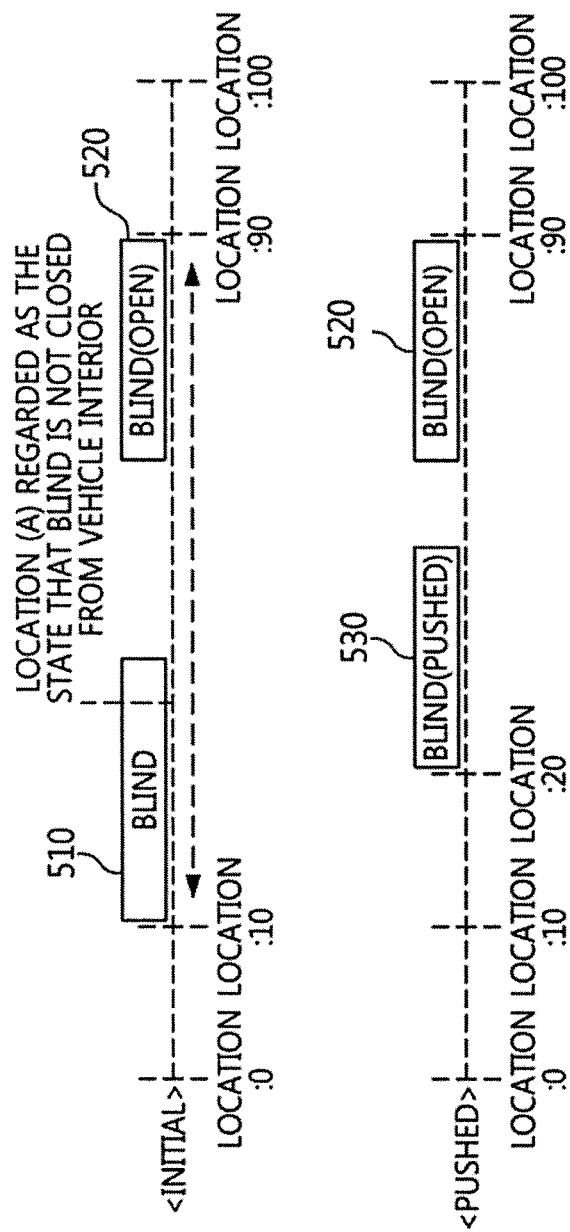
FIG. 5 is a conceptual diagram illustrating the state that the actual location of the sunroof blind and the recognized location of the controller are the same in accordance with an embodiment of the present disclosure.

FIG. 5 is a conceptual diagram illustrating the state where the actual location of the sunroof blind 110 and the recognized location of the controller 130 are the same in accordance with an embodiment of the present disclosure. Referring to FIG. 5, in an "initial state," the sunroof blind 110 is in a close state 510 or in an open state 520.

In a "pushed state," the sunroof blind 110 is in the pushed state 530. That is, the sunroof blind 110 is located at "location: 20." In this case, the close is not forcibly performed in the state in which the sunroof blind 110 does not reach the reference value A yet. That is, since the location is not largely changed at a time, the controller 130 accepts it.

Figure 6:
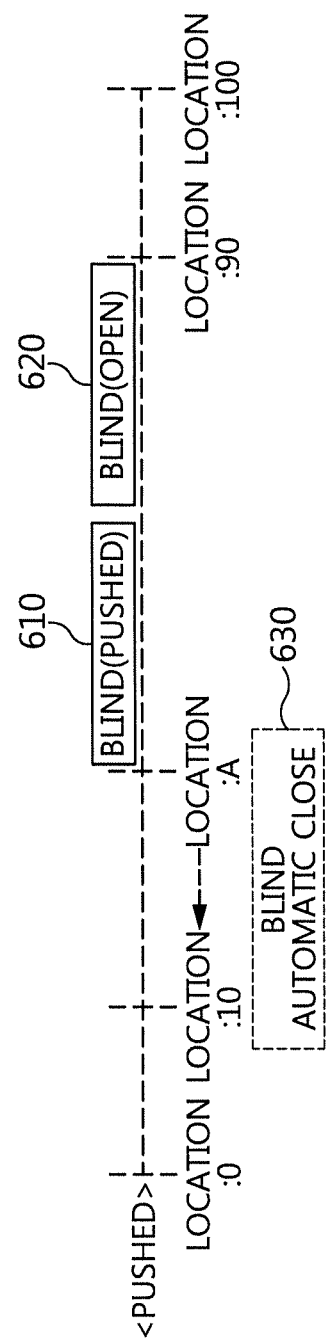
FIG. 6 is a conceptual diagram illustrating the case where the sunroof blind completely deviates from a reference location in accordance with an embodiment of the present disclosure.

FIG. 6 is a conceptual diagram illustrating the case where the sunroof blind 110 completely deviates from the reference location in accordance with an embodiment of the present disclosure. Referring to FIG. 6, the sunroof blind 110 is in the pushed state that is deviated from the reference value A 610. That is, it is the state that the sunroof blind 110 is in the pushed state that deviates "location: A." In this case, the blind automatic close 630 is forcibly performed. That is, the sunroof blind 110 is forcibly moved from "location: A" to "location: 10."

In addition, the steps of the method or the algorithm explained regarding the embodiments disclosed herein are implemented as a program command format that can be performed through various computers means to be recorded in a computer readable medium. The computer readable medium can include a program (command) code, a data file, a data structure, etc., separately or in a combination thereof.

The program (command) code recorded in the medium can be the ones specially designed or configured for the present disclosure, or can be the one known and available to those skilled in the computer software. Examples of the computer readable medium can include a magnetic media such as a hard disk, a floppy disk, and a magnetic tape, an optical media such as a CD-ROM, a DVD, and a Blue ray, and a semiconductor storage device specially configured to store and perform a program (command) code such as a ROM, a RAM, and a flash memory.

Herein, examples of the program (command) code include a high-level language code that can be executed by a computer using an interpreter, etc., as well as a machine language code made such as those produced by a complier. The hardware device can be configured to operate as one or more software modules in order to perform the operation of the present disclosure, and vice versa.

What is claimed is:
1. An apparatus for tracking a location of a sunroof blind, comprising:
   a motor connected to the sunroof blind by a cable; and
   a controller for determining whether or not a wake-up source is generated according to an electromotive force of the motor generated when the cable is moved by an external force in a non-operation state of the sunroof blind, and for correcting location information of the sunroof blind upon determining that the wake-up source is generated according to the electromotive force of the motor,
   wherein the controller calculates the location information by adding a setting value to a previously stored location value of the sunroof blind when the wake-up source is the electromotive force of the motor generated by the external force.

2. The apparatus of claim 1, wherein the controller closes the sunroof blind when a corrected location value of the location information is greater than a reference value.

3. The apparatus of claim 2, wherein the reference value indicates that the sunroof blind is in an incomplete close state.

4. The apparatus of claim 1, wherein the controller operates the motor according to an operation command such that the controller determines whether or not the wake-up source is generated by the operation command according to a user's input.

5. The apparatus of claim 1, further comprising a sensor for sensing an amount of rotation of the motor to generate the location information.

6. The apparatus of claim 1, further comprising a display device for outputting the location information.

7. The apparatus of claim 6, wherein the display device displays at least one of graphics, characters, or voices.

8. The apparatus of claim 1, wherein, when a corrected location value is smaller than a reference value and a number of occurrences, in which the corrected location value is smaller than the reference value, is greater than a reference number, the controller closes the sunroof blind.

9. A method for tracking a location of a sunroof blind, comprising steps of:
   determining, by a controller, whether or not a wake-up source is generated according to an electromotive force of a motor that is connected to the sunroof blind by a cable, wherein the electromotive force of the motor is generated when the cable is moved by an external force in a non-operation state of the sunroof blind; and
   upon determining that the wake-up source is generated according to the electromotive force of the motor, correcting, by the controller, location information of the sunroof blind,
   wherein the controller calculates the location information by adding a setting value to a previously stored location value of the sunroof blind when the wake-up source is the electromotive force of the motor generated by the external force.

10. The method of claim 9, wherein the controller closes the sunroof blind when a corrected location value of the corrected location information is greater than a reference value.

11. The method of claim 10, wherein the reference value indicates that the sunroof blind is in an incomplete close state.

12. The method of claim 9, wherein the controller operates the motor according to an operation command such that the step of determining is executed by the operation command according to a user's input.

13. The method of claim 9, wherein the location information is generated through a sensor for sensing an amount of rotation of the motor.

14. The method of claim 9, further comprising a step of outputting the location information to a display device.

15. The method of claim 14, wherein the step of outputting outputs at least one of graphics, characters, or voices.

* * * * *